(12) United States Patent
Tsuruta et al.

(10) Patent No.: US 9,819,791 B2
(45) Date of Patent: Nov. 14, 2017

(54) MOBILE ELECTRONIC DEVICE, CONTROL METHOD, AND CONTROL PROGRAM

(71) Applicant: KYOCERA Corporation, Kyoto-shi, Kyoto (JP)

(72) Inventors: Hiroshi Tsuruta, Yokohama (JP); Daisuke Ibuki, Yokohama (JP); Yuki Yamada, Yokohama (JP); Hideko Murakami, Yokohama (JP); Nayu Nomachi, Yokohama (JP); Fumiyuki Ito, Higashiosaka (JP)

(73) Assignee: KYOCERA CORPORATION, Kyoto (JP)

( * ) Notice: Subject to any disclaimer, the term of this patent is extended or adjusted under 35 U.S.C. 154(b) by 119 days.

(21) Appl. No.: 14/780,306

(22) PCT Filed: Mar. 19, 2014

(86) PCT No.: PCT/JP2014/057527
§ 371 (c)(1),
(2) Date: Sep. 25, 2015

(87) PCT Pub. No.: WO2014/156877
PCT Pub. Date: Oct. 2, 2014

(65) Prior Publication Data
US 2016/0057280 A1    Feb. 25, 2016

(30) Foreign Application Priority Data
Mar. 25, 2013   (JP) ................................ 2013-062211

(51) Int. Cl.
*H04M 1/725*    (2006.01)
*H04M 19/04*    (2006.01)
*H04M 3/436*    (2006.01)

(52) U.S. Cl.
CPC ... *H04M 1/72597* (2013.01); *H04M 1/72583* (2013.01); *H04M 3/436* (2013.01); *H04M 19/04* (2013.01)

(58) Field of Classification Search
CPC ....... H04M 19/04; H04W 4/12; H04W 48/08; H04W 48/18
(Continued)

(56) References Cited

U.S. PATENT DOCUMENTS 5,924,046 A      7/1999   Martensson

FOREIGN PATENT DOCUMENTS

EP      1063837 A2    12/2000
JP      9-18566 A     1/1997
(Continued)

OTHER PUBLICATIONS

Extended European Search Report in EP Application No. 14774965.9, dated Sep. 22, 2016.
(Continued)

*Primary Examiner* — Sam Bhattacharya
(74) *Attorney, Agent, or Firm* — Hauptman Ham, LLP

(57) ABSTRACT

In one aspect, a mobile electronic device includes a sound input module and a controller for performing off-hook when sound input to the sound input module is accepted at a time of incoming call. The mobile electronic device performs off-hook when a response operation to the incoming call is detected through a touch screen, starts to accept sound input through the sound input module when a response operation to the incoming call is not detected through the touch screen, and performs off-hook when the sound input is accepted.

4 Claims, 12 Drawing Sheets

(58) Field of Classification Search
USPC ........ 455/412.1, 412.2, 414.1, 418; 370/465, 370/493
See application file for complete search history.

(56) References Cited

FOREIGN PATENT DOCUMENTS

| | | |
|---|---|---|
| JP | 9-186757 A | 7/1997 |
| JP | 2000-341376 A | 12/2000 |
| JP | 2001-16302 A | 1/2001 |
| JP | 2003-32324 A | 1/2003 |
| JP | 2012-227655 A | 11/2012 |
| WO | 2008/086302 A1 | 7/2008 |

OTHER PUBLICATIONS

International Search Report dated May 20, 2014, corresponding to International application No. PCT/JP2014/057527.

FIG.6

| RESPONSE STATE LEVEL |
|---|
| LEVEL 0 (NORMAL RESPONSE STATE) |

FIG.7

| RESPONSE STATE LEVEL | OFF-HOOK CONDITION |
|---|---|
| LEVEL 0 (NORMAL RESPONSE STATE) | FLICK OF RESPONSE ICON |
| LEVEL 1 (SIMPLE RESPONSE STATE 1) | DETECTION OF PREDETERMINED KEYWORD TWICE WITHIN GIVEN TIME |
| LEVEL 2 (SIMPLE RESPONSE STATE 2) | DETECTION OF PREDETERMINED KEYWORD ONCE WITHIN GIVEN TIME |

| RESPONSE STATE LEVEL | OFF-HOOK CONDITION |
|---|---|
| LEVEL 0<br>(NORMAL RESPONSE STATE) | FLICK OF RESPONSE ICON |
| LEVEL 1<br>(SIMPLE RESPONSE STATE 1) | TAP ON RESPONSE ICON |
| LEVEL 2<br>(SIMPLE RESPONSE STATE 2) | TOUCH ON DISPLAY |

| RESPONSE STATE LEVEL | OFF-HOOK CONDITION |
|---|---|
| LEVEL 0 (NORMAL RESPONSE STATE) | FLICK OF RESPONSE ICON |
| LEVEL 1 (SIMPLE RESPONSE STATE 1) | DETECTION OF PREDETERMINED KEYWORD TWICE WITHIN 10 SECONDS |
| LEVEL 2 (SIMPLE RESPONSE STATE 2) | DETECTION OF CALL-RECEIVING OPERATION |

MOBILE ELECTRONIC DEVICE, CONTROL METHOD, AND CONTROL PROGRAM

CROSS-REFERENCE TO RELATED APPLICATION

This application is a National Stage of PCT international application Ser. No. PCT/JP2014/057527 filed on Mar. 19, 2014 which designates the United States, incorporated herein by reference, and which is based upon and claims the benefit of priority from Japanese Patent Application No. 2013-062211 filed on Mar. 25, 2013, the entire contents of which are incorporated herein by reference.

FIELD

The present application relates to a mobile electronic device, a control method, and a control program.

BACKGROUND

Some of mobile electronic devices with a touch screen display such as smartphones require a predetermined touch operation when responding to an incoming call. For example, when there is an incoming call, it is configured to display an icon for responding to the incoming call on a display and perform off-hook in response to an operation on the icon. An example of the touch operation is described in, for example, International Publication Pamphlet No. 2008/086302.

SUMMARY

According to an aspect, a mobile electronic device includes a sound input module and a controller configured to perform an off-hook operation if the sound input module accepts a sound input upon receiving a call.

According to another aspect, a control method executed by a mobile electronic device including a sound input module is provided. The control method includes a step of performing an off-hook operation if the sound input module accepts a sound input upon receiving a call.

According to another aspect, a computer program product having computer instructions, stored on a non-transitory computer readable storage medium, for enabling a computer of a mobile electronic device including a sound input module executing the computer instructions to perform operations comprises: performing an off-hook operation if the sound input module accepts a sound input upon receiving a call.

BRIEF DESCRIPTION OF DRAWINGS

FIG. 6 is a diagram of an example of response-state-level management data according to an embodiment of some embodiments.

FIG. 7 is a diagram of an example of response-state-level corresponding operation data according to an embodiment of some embodiments.

DESCRIPTION OF EMBODIMENTS

Exemplary embodiments for implementing the present disclosure will be explained in detail below with reference to the accompanying drawings. A smartphone will be explained below as an example of the mobile electronic device according to the present disclosure.

Figure 1:
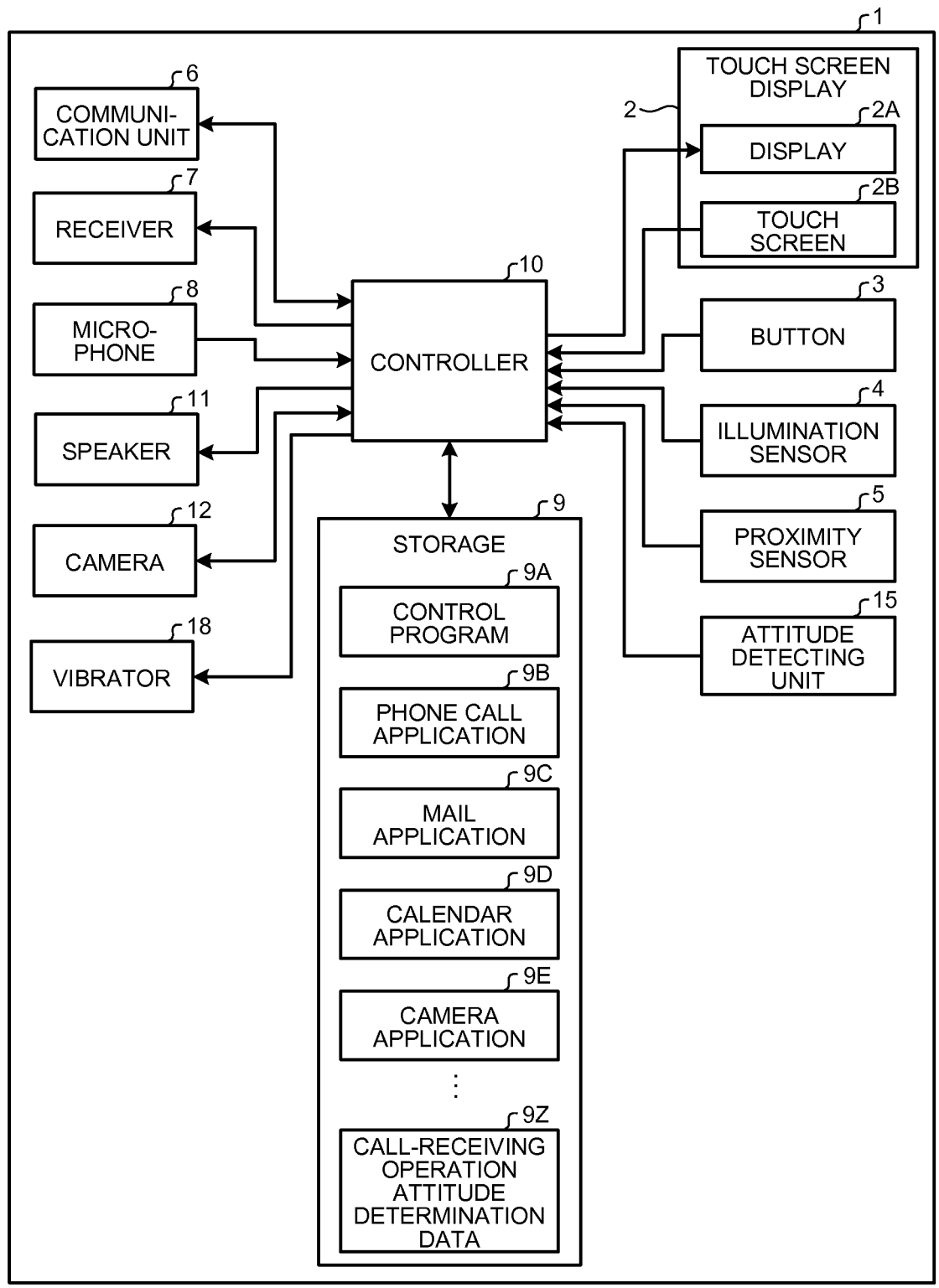
FIG. 1 is a block diagram of a functional configuration of a smartphone according to an embodiment of some embodiments.

An example of a functional configuration of a smartphone 1 according to an embodiment will be explained below. FIG. 1 is a block diagram of the functional configuration of a smartphone according to an embodiment of some embodiments. In the following description, the same reference numerals may be assigned to similarly components. Furthermore, redundant description may be omitted.

As illustrated in FIG. 1, the smartphone 1 includes a touch screen display 2, a button 3, an illumination sensor 4, a proximity sensor 5, a communication module 6, a receiver 7, a microphone 8, a storage 9, a controller 10, a speaker 11, a camera 12, an attitude detecting module 15, and a vibrator 18.

The touch screen display 2 includes a display 2A and a touch screen 2B. The display 2A and the touch screen 2B may be arranged, for example, in a superimposed manner, side by side, or apart from each other. If the display 2A and the touch screen 2B are arranged in the superimposed manner, for example, one or more sides of the display 2A do not have to be along any of the sides of the touch screen 2B.

The display 2A includes a display device such as an LCD (Liquid Crystal Display), an OELD (Organic Electro-Luminescence Display), or an IELD (Inorganic Electro-Luminescence Display). The display 2A displays text, images, symbols, graphics, and the like. A screen including text, images, symbols, graphics, and the like displayed by the display 2A includes a screen called "lock screen", a screen called "home screen", and an application screen displayed during execution of an application. The home screen may also be called "desktop", "standby screen", "idle screen", "standard screen", "app list screen", or "launcher screen". In an embodiment of some embodiments, the display 2A displays a screen to notify an incoming call. The screen to notify an incoming call includes an object for response operation (hereinafter, response icon) for accepting an operation of responding to an incoming call at the time of the incoming call.

The touch screen 2B detects a contact of a finger, a pen, a stylus pen, or the like on the touch screen 2B. The touch screen 2B can detect positions where a plurality of fingers, pens, stylus pens, or the like (hereinafter, simply called "finger") make contact with the touch screen 2B. The touch screen 2B notifies the controller 10 of the contact of the finger on the touch screen 2B (touch screen display 2) along with the position where it is contacted on the touch screen display 2. In an embodiment, for example, when there is an incoming call, the touch screen 2B notifies the controller 10 of the contact of the finger on the touch screen display 2 and the position on the touch on the touch screen display 2.

The detection method of the touch screen 2B may be any detection method of a capacitive type detection method, a resistive type detection method, a surface acoustic wave type (or ultrasonic type) detection method, an infrared type detection method, an electromagnetic induction type detection method, and a load sensing type detection method. In the description herein below, for the sake of simplicity, it is assumed that the user uses his/her finger(s) to make contact with the touch screen 2B in order to operate the smartphone 1.

The controller 10 (smartphone 1) determines a type of a gesture based on at least one of a contact detected by the touch screen 2B, a position where the contact is detected, a change of the position where the contact is detected, an time interval between detected contacts, and the number of detection times of the contact. The gesture is an operation performed on the touch screen 2B (touch screen display 2) using the finger(s). Examples of the gesture determined by the controller 10 (smartphone 1) through the touch screen 2B include, but are not limited to, touch, long touch, release, swipe, tap, double tap, long tap, drag, flick, pinch in, and pinch out. In an embodiment, the controller 10 (smartphone 1) determines a gesture on the response icon based on the contact of the finger and the position of the contact notified from the touch screen 2B, and performs off-hook processing or the like.

The button 3 accepts an operation input from the user. The number of buttons 3 may be single or plural.

The illumination sensor 4 detects illumination of a ambient light of the smartphone 1. The illumination indicates intensity of light, lightness, or brightness. The illumination sensor 4 is used, for example, to adjust a brightness of the display 2A.

The proximity sensor 5 detects a presence of a nearby object without any physical contact. The proximity sensor 5 detects the presence of the object based on a change of a magnetic field, a change of a return time of a reflected ultrasonic wave, etc. The proximity sensor 5 detects that, for example, the display 2A is brought close to someone's face. The illumination sensor 4 and the proximity sensor 5 may be configured as one sensor. The illumination sensor 4 can be used as a proximity sensor.

The communication module 6 communicates by wireless. A wireless communication standard supported by the communication module 6 includes a cellular-phone communication standard such as 2G, 3G, and 4G, and a short-distance wireless communication standard. The cellular-phone communication standard includes, for example, LTE (Long Term Evolution), W-CDMA (Wideband Code Division Multiple Access), WiMAX (Worldwide Interoperability for Microwave Access), CDMA 2000, PDC (Personal Digital Cellular), GSM (registered trademark) (Global System for Mobile Communications), and PHS (Personal Handy-phone System). The short-distance wireless communication standard includes, for example, IEEE 802.11, Bluetooth (registered trademark), IrDA (Infrared Data Association), NFC (Near Field Communication), and WPAN (Wireless Personal Area Network). A WPAN communication standard includes, for example, ZigBee (registered trademark). The communication module 6 may support one or more of the communication standards.

The communication module 6 receives a radio signal of a predetermined frequency band from a GPS satellite, performs demodulation processing on the received radio signal, and transmits the processed signal to the controller 10. The smartphone 1 may be provided with a discrete communication module independent from the communication module 6 by separating the communication function with the GPS satellite from the communication module 6.

The receiver 7 is a sound output module. The receiver 7 outputs a sound signal transmitted from the controller 10 as a sound. The receiver 7 is used, for example, to output the other party's voice during a call. The microphone 8 is a sound input module. The microphone 8 converts the user's voice or the like to a sound signal and transmits the sound signal to the controller 10.

The storage 9 stores programs and data. The storage 9 is used also as a work area for temporarily storing a processing result of the controller 10. The storage 9 may include any non-transitory storage medium such as a semiconductor storage medium and a magnetic storage medium. The storage 9 may include a plurality of types of storage mediums. The storage 9 may include a combination of a portable storage medium such as a memory card, an optical disc, or a magneto-optical disc with a reader of the storage medium. The storage 9 may include a storage device used as a temporary storage area such as RAM (Random Access Memory).

Programs stored in the storage 9 include applications executed in the foreground or the background and a control program for assisting operations of the applications. As an application executed in the foreground, for example, a screen is displayed on the display 2A. The control program includes, for example, an OS. The applications and the control program may be installed in the storage 9 through wireless communication by the communication module 6 or through a non-transitory storage medium.

The storage 9 stores, for example, a control program 9A, a phone call application 9B, a mail application 9C, a calendar application 9D, a camera application 9E, and call-receiving operation attitude determination data 9Z.

The control program 9A provides a function related to various controls for operating the smartphone 1. The control program 9A provides a function for performing off-hook when sound input to the microphone 8 is accepted at the time of incoming call. Specifically, the control program 9A provides a function for performing off-hook when a response operation to the incoming call is detected through the touch screen 2B, starting to accept the sound input by the microphone 8 when a response operation to the incoming call is not detected through the touch screen 2B, and performing off-hook when the sound input is accepted. The case where a response operation to the incoming call is not detected includes, for example, a case where an incomplete operation for the response icon is detected.

Additionally, the control program 9A provides a function for implementing communication, by controlling the communication module 6 or the like, using LTE (Long Term Evolution), W-CDMA (Wideband Code Division Multiple Access), WiMAX (Worldwide Interoperability for Microwave Access), CDMA 2000, PDC (Personal Digital Cellular), GSM (registered trademark) (Global System for Mobile Communications), and PHS (Personal Handy-phone System), etc., provides a function for implementing short-distance wireless communication using IEEE 802.11, Bluetooth (registered trademark), IrDA (Infrared Data Association), NFC (Near Field Communication), and WPAN (Wireless Personal Area Network), etc., and provides a function for making a phone call by controlling the communication module 6 and the microphone 8, etc.

The functions provided by the control program 9A may be used, when a phone call is made, in combination with a function provided by the other program stored in the storage 9, such as the phone call application 9B or the mail application 9C. The functions provided by the control program 9A may be divided into a plurality of program modules or may be combined with the other program.

The phone call application 9B provides a phone call function for phone calls through wireless communication. The mail application 9C provides an e-mail function for compositing, transmitting, receiving, displaying e-mails, and the like. The calendar application 9D provides a calendar function for schedule management and the like. The camera application 9E provides a function for, for example, photographing, editing, and managing images and moving images. The applications stored in the storage 9 are only an example. In addition to the applications illustrated in FIG. 1, a notepad application, a browser application, a navigate application, a music player application, a moving image reproduction application, a calculator application, a tag application, and the like may be stored therein.

The call-receiving operation attitude determination data 9Z is data for determining whether an attitude of the smartphone 1 matches the call-receiving operation based on the detection result of the attitude detecting module 15. For example, when the user takes the call-receiving operation, data for an angle between a direction of the gravitational acceleration and a direction of the smartphone 1 held by the user is stored.

The controller 10 is a processor. Examples of the processor include, but are not limited to, a CPU (Central Processing Unit), an SoC (System-on-a-chip), an MCU (Micro Control Unit), and an FPGA (Field-Programmable Gate Array). The controller 10 integrally controls the operations of the smartphone 1 to implement various functions. The controller 10 is part of a control module.

Specifically, the controller 10 executes instructions included in a program stored in the storage 9 while referring to data stored in the storage 9 as necessary. The controller 10 then controls function modules according to the data and the instructions to thereby implement the various functions. Examples of the function modules include, but are not limited to, the display 2A, the communication module 6, the microphone 8, and the speaker 11. The controller 10 can change the control according to the detection result of a detector. Examples of the detector include, but are not limited to, the touch screen 2B, the button 3, the illumination sensor 4, the proximity sensor 5, the microphone 8, the camera 12, and the attitude detecting module 15.

The controller 10 executes the control program 9A to thereby implement the processing for off-hook when sound input to the microphone 8 is accepted at the time of incoming call. Specifically, the controller 10 performs off-hook when detecting a response operation to the incoming call through the touch screen 2B, starts to accept the sound input by the microphone 8 when not detecting a response operation to the incoming call through the touch screen 2B, and performs off-hook when accepting the sound input. The case where the response operation to the incoming call is not detected includes, for example, a case where an incomplete operation for the response icon is detected.

The speaker 11 is a sound output module. The speaker 11 outputs a sound signal transmitted from the controller 10 as a sound. The speaker 11 is used to output, for example, a ring tone and music. One of the receiver 7 and the speaker 11 may have the other function.

The camera 12 converts a photographed image to an electric signal. The camera 12 includes, for example, an in-camera for photographing an object facing the display 2A and an out-camera for photographing an object facing the opposite side of the display 2A.

The attitude detecting module 15 detects an attitude of the smartphone 1. The attitude detecting module 15 includes at least one of an acceleration sensor, a direction sensor, and a gyroscope in order to detect the attitude. The attitude detecting module 15 detects, for example, the attitude of the smartphone 1 based on the detection result of the acceleration sensor, the direction sensor, the gyroscope, or the like. The attitude detecting module 15 transmits the detection result of the attitude of the smartphone 1 to the controller 10.

The vibrator 18 vibrates part or whole of the smartphone 1. The vibrator 18 includes, for example, a piezoelectric element or an eccentric motor in order to generate vibration. The vibration generated by the vibrator 18 is used to inform the user of various events such as incoming calls.

Figure 2:
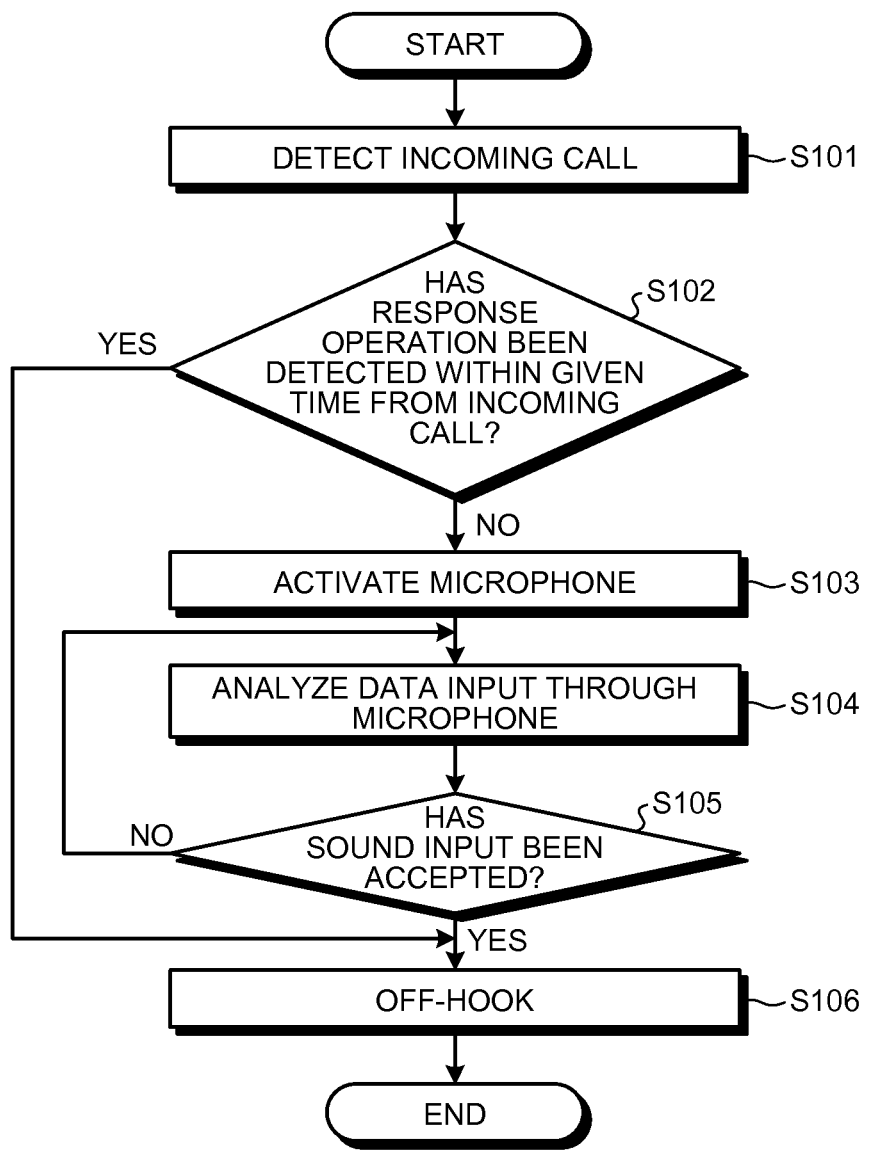
FIG. 2 is a flowchart illustrating a flow of control performed by a smartphone according to an embodiment of some embodiments.

Then, an example of control performed by the smartphone 1 according to an embodiment will be explained with reference to FIG. 2. FIG. 2 is a flowchart illustrating a flow of control performed by the smartphone 1 according to an embodiment. The control illustrated in FIG. 2 is implemented by the controller 10 reading the control program 9A or the like from the storage 9 and executing the read program. FIG. 2 represents a flow of the control during ongoing of the incoming call after the detection of the incoming call or until off-hook is performed.

As illustrated in FIG. 2, when detecting an incoming call (Step S101), the controller 10 determines whether a response operation has been detected within a given time from the incoming call (Step S102). At Step S102, it is determined whether a normal response operation to the incoming call (e.g., a flick of the response icon) that is previously assumed has been accepted. A case of failure in the response operation is not included in a case of detection of the response operation. When the determination result at Step S102 is No, the controller 10 determines that the normal response operation is failed, and, as explained below, implements the control of off-hook according to a user's intention of making a phone call so as not to make the user, who assumes that the phone call is established and performs a call operation, confused.

When it is determined that the response operation has not been detected within the given time from the incoming call (No at Step S102), the controller 10 activates the microphone 8 (Step S103). Subsequently, the controller 10 analyzes the data input through the microphone 8 (Step S104), and determines whether the sound input has been accepted (Step S105).

When it is determined that the sound input has been accepted (Yes at Step S105), the controller 10 performs off-hook (Step S106), and ends the control illustrated in FIG. 2. On the other hand, when it is determined that the sound input has not been accepted (No at Step S105), the controller 10 returns to Step S104.

At Step S102, when it is determined that the response operation has been detected within the given time from the incoming call (Yes at Step S102), the controller 10 proceeds to the procedure at Step S106, performs off-hook, and ends the control illustrated in FIG. 2.

In the control illustrated in FIG. 2, the operations at Step S105 to Step S106 are not limited to the case where the controller 10 accepts the sound input and performs off-hook. For example, the controller 10 may be configured to analyze the data input through the microphone 8 and perform off-hook when a predetermined keyword is detected within a given time. Alternatively, the controller 10 may be configured to analyze the data input through the microphone 8 and perform off-hook when a plurality of predetermined keywords are detected within a given time. The predetermined keyword should be a keyword assumed as a response to the phone call such as "Hello" or "Hi".

In the control illustrated in FIG. 2, an example has been explained in which the controller 10 determines whether the normal response operation has been detected within the given time at Step S102; however, embodiments are not limited to this example. For example, the controller 10 may be configured to activate the microphone 8 without determining whether the normal response operation is detected and to perform off-hook if there is sound input.

Figure 3:
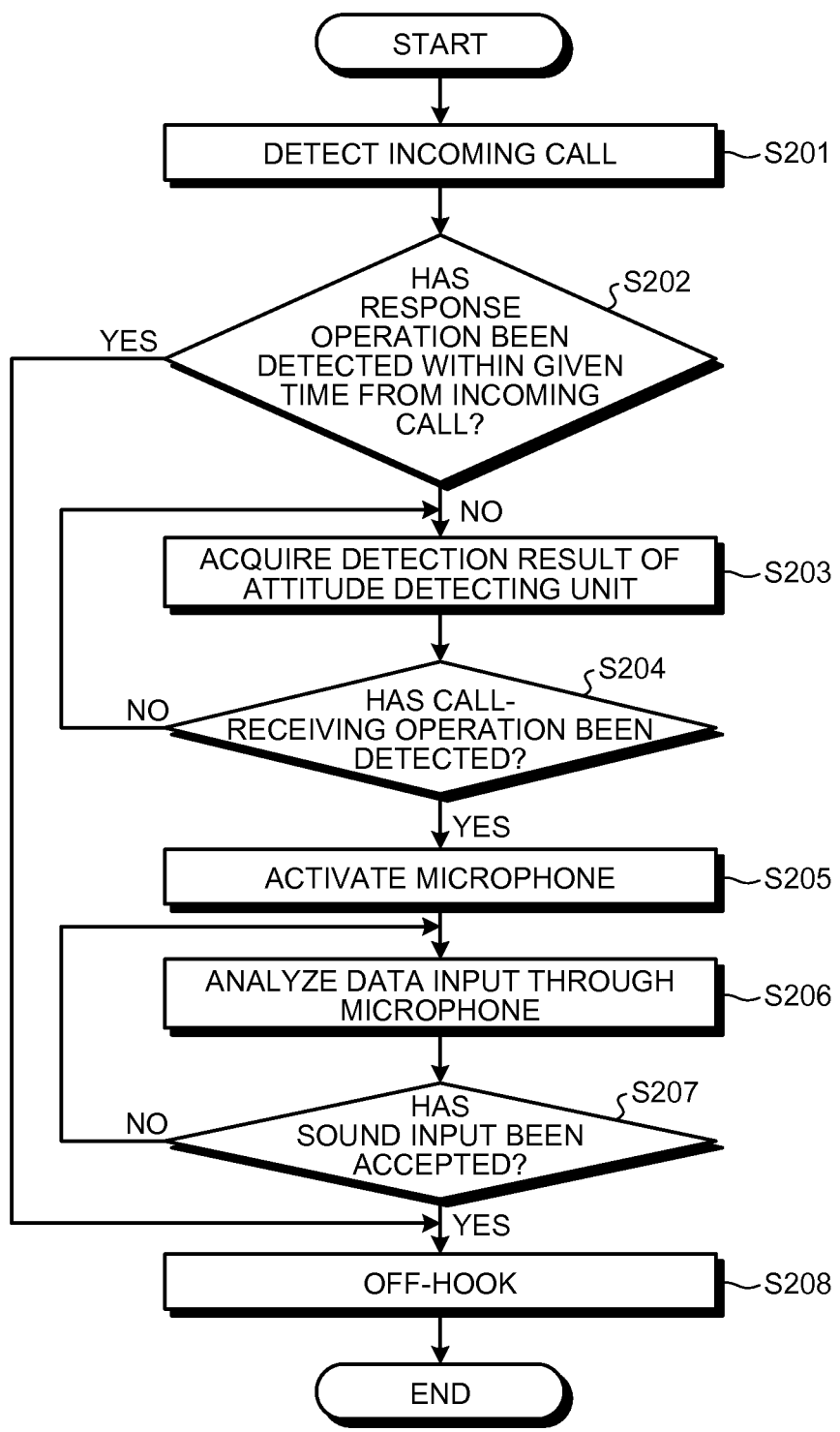
FIG. 3 is a flowchart illustrating a flow of another control performed by a smartphone according to an embodiment of some embodiments.
Figure 4:
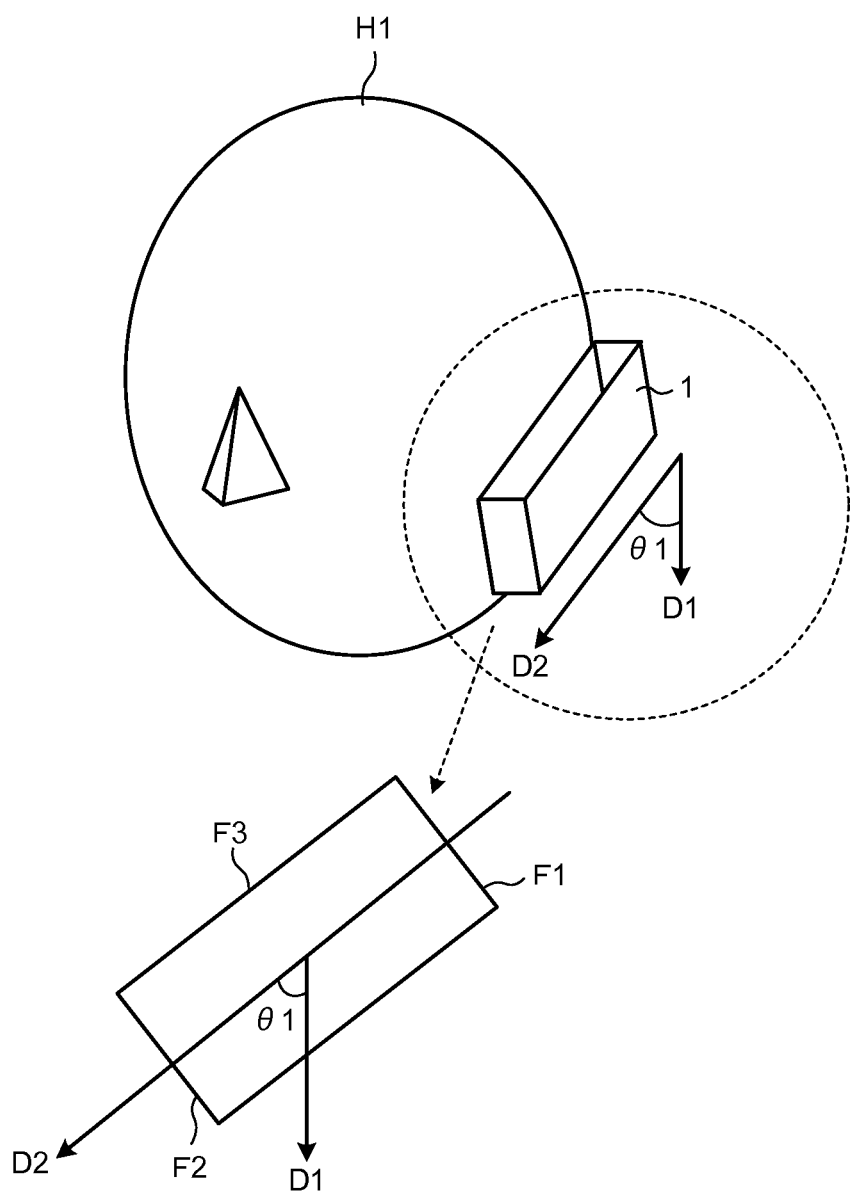
FIG. 4 is a diagram for explaining how to detect a call-receiving operation.

In the control illustrated in FIG. 2, the smartphone 1 may activate the microphone 8 when detecting the call-receiving operation of the user. Thus, an example of another control performed by the smartphone 1 according to an embodiment will be explained below with reference to FIG. 3 and FIG. 4. FIG. 3 is a flowchart illustrating a flow of another control performed by the smartphone according to an embodiment. FIG. 4 is a diagram for explaining how to detect a call-receiving operation. The control illustrated in FIG. 3 is implemented by the controller 10 reading the control program 9A or the like from the storage 9 and executing the read program. In the control illustrated in FIG. 3, the procedure at Step S203 is different from that of the control illustrated in FIG. 2. FIG. 3 represents a flow of the control during ongoing of an incoming call after the detection of the incoming call or until off-hook is performed.

As illustrated in FIG. 3, when detecting an incoming call (Step S201), the controller 10 determines whether a response operation has been detected within a given time from the incoming call (Step S202).

When it is determined that the response operation has not been detected within the given time from the incoming call (No at Step S202), the controller 10 then acquires a detection result of the attitude of the smartphone 1 (Step S203), and determines whether the call-receiving operation has been detected (Step S204).

Specifically, the controller 10 determines the attitude of the smartphone 1 based on the detection result of the attitude detecting module 15 and determines whether the call-receiving operation has been detected. The attitude detecting module 15 detects the attitude of the smartphone 1 based on the detection result of the acceleration sensor, the direction sensor, the gyroscope, or so. For example, as illustrated in FIG. 4, the attitude detecting module 15 detects an angle "θ1" between a direction D1 of the gravitational acceleration and a direction D2 of the smartphone 1 held by a user H1, and transmits the detected angle to the controller 10. The direction D2 of the smartphone 1 is vertical to a face F1 of a housing of the smartphone 1 on the side where the receiver 7 is mounted and to a face F2 thereof on the side where the microphone 8 is mounted, and is parallel to a face F3 of the housing of the smartphone 1. The face F1 and the face F2 of the housing are assumed to vertically intersect the face F3 of the housing. When acquiring the angle "θ1" between the direction D1 of the gravitational acceleration and the direction D2 of the smartphone 1 from the attitude detecting module 15, the controller 10 determines whether the angle "θ1" matches the angle at which the call-receiving operation is performed by the user. When the angles match each other, the controller 10 determines that the attitude of the smartphone 1 matches the call-receiving operation, and detects that the operation is the call-receiving operation. The attitude detecting module 15 then transmits the information to the effect that the call-receiving operation is detected to the controller 10. When accepting the information to the effect that the call-receiving operation is detected from the attitude detecting module 15, the controller 10 determines that the call-receiving operation is detected.

When it is determined that the call-receiving operation has been detected (Yes at Step S204), the controller 10 activates the microphone 8 (Step S205). Subsequently, the controller 10 analyzes the data input through the microphone 8 (Step S206), and determines whether the sound input has been accepted (Step S207).

When it is determined that the sound input has been accepted (Yes at Step S207), the controller 10 performs off-hook (Step S208), and ends the control illustrated in FIG. 3. On the other hand, when it is determined that the sound input has not been accepted (No at Step S207), the controller 10 returns to Step S206.

At Step S204, when it is determined that the call-receiving operation has not been detected (No at Step S204), the controller 10 returns to Step S203, and again acquires the detection result of the attitude of the smartphone 1.

At Step S202, when it is determined that the response operation has been detected within the given time from the incoming call (Yes at Step S202), the controller 10 proceeds to the procedure at Step S208, performs off-hook, and ends the control illustrated in FIG. 3.

In the controls illustrated in FIG. 2 and FIG. 3, an example has been explained in which the off-hook is controlled according to acceptance of the sound input when the response operation has not been detected within the given time from the incoming call. In other words, the controls illustrated in FIG. 2 and FIG. 3 are intended to cope with the state in which the user fails the normal response operation many times due to his/her confusion. However, when the normal response operation is detected before the sound input, the off-hook may be performed.

As explained above, in the first embodiment, for example, when the response operation is not detected within the given time from the incoming call at the time of the incoming call, the smartphone 1 performs off-hook according to the acceptance of the sound input. Therefore, according to an embodiment, it is possible to facilitate a response to the incoming call. For example, when the user of the smartphone 1 is elderly, it is conceivable that he/she may fail in a touch operation on the touch screen 2B many times such as a flick of the response icon. In an embodiment, even if the user fails in the touch operation, the smartphone 1 performs off-hook if there is sound input, and this makes it easier for even elderly users to respond to the incoming call.

In an embodiment, for example, when the response operation is not detected within the given time from the incoming call at the time of the incoming call, the smartphone 1 determines whether the call-receiving operation is detected. When the call-receiving operation is detected, the smartphone 1 performs off-hook according to the acceptance of the sound input. Therefore, according to an embodiment, it is possible to efficiently perform the control for facilitating the response to the incoming call. For example, when the user of the smartphone 1 is elderly, it is conceivable that he/she may misunderstand that a touch operation such as a flick of the response icon is successful and immediately takes a call-receiving operation. Because it can be considered that there will be sound input generally after the call-receiving operation, the smartphone 1 activates the microphone 8 after the detection of the call-receiving operation, and performs off-hook if there is the sound input. Therefore, it is possible to efficiently perform the control for facilitating the response to the incoming call.

In an embodiment, the smartphone 1 may perform off-hook only if the call-receiving operation is detected at the time of incoming call. Alternatively, the smartphone 1 may perform off-hook, for example, when the normal response operation is not detected within the given time and then the call-receiving operation is detected.

In above embodiments, it has explained an example of the control for performing off-hook responding to the acceptance of sound input at the time of incoming call, for example, when the response operation is not detected within the given time from the incoming call. Another embodiment as follows will explain examples of a control for performing off-hook when the content of sound input satisfies the condition for performing off-hook and of a control for changing the condition for performing off-hook according to the call-receiving operation.

Figure 5:
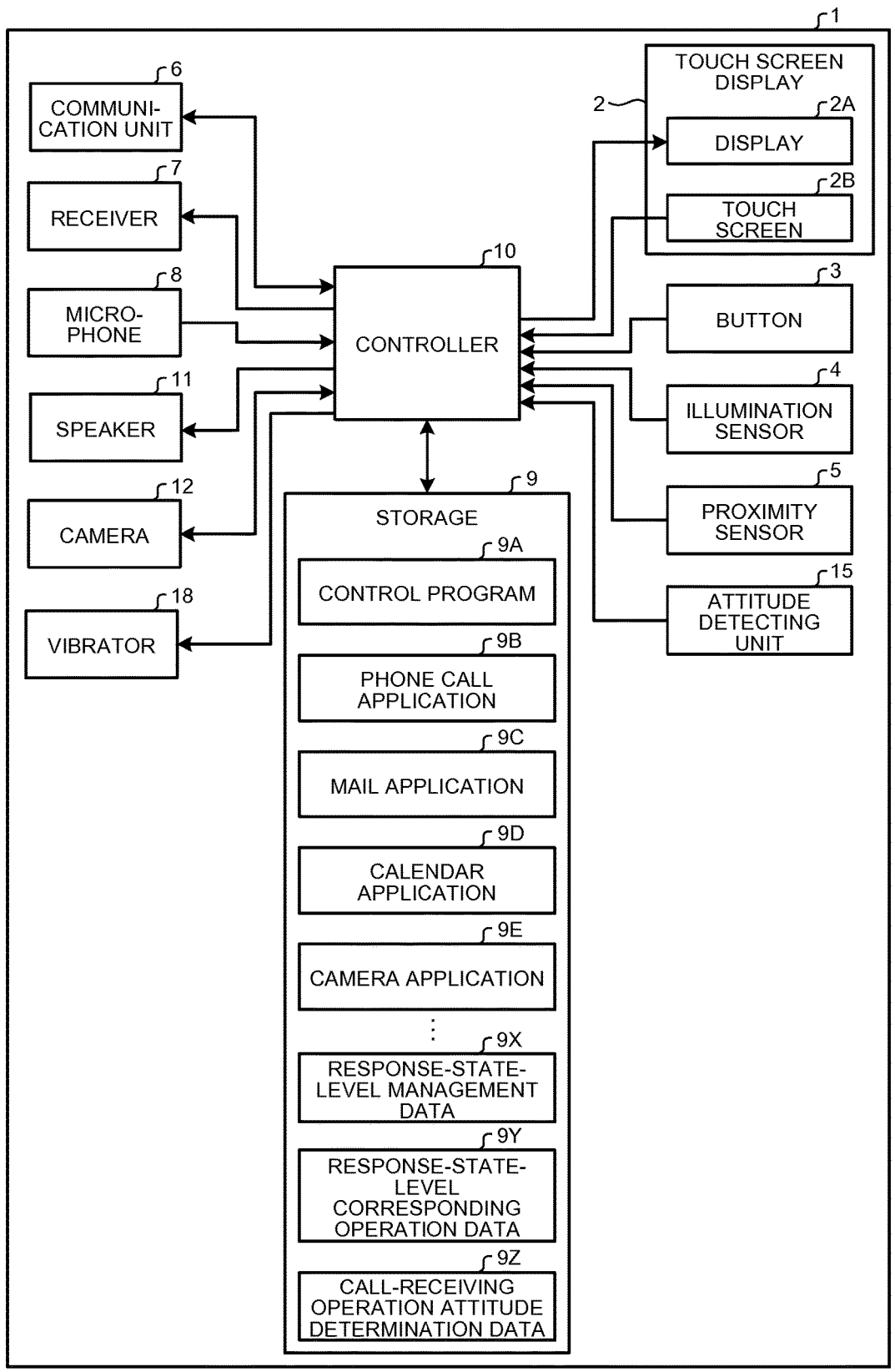
FIG. 5 is a block diagram of a functional configuration of a smartphone according to an embodiment of some embodiments.

FIG. 5 is a block diagram of a functional configuration of a smartphone according to an embodiment. The functional configuration of the smartphone 1 according to an embodiment is different from the first embodiment in some points explained below.

The storage 9 further stores response-state-level management data 9X and response-state-level corresponding operation data 9Y, in addition to the control program 9A, the phone call application 9B, the mail application 9C, the calendar application 9D, the camera application 9E, and the call-receiving operation attitude determination data 9Z.

The control program 9A provides a function for updating the response state level recoded in the response-state-level management data 9X, which is explained later, according to a situation that can be determined as a failure in a previously assumed normal response operation to the incoming call. Specifically, the control program 9A provides a function for increasing the response state level by one level at the time of incoming call on condition that the call-receiving operation is detected based on the detection result of the attitude by the attitude detecting module 15 when the normal response operation (e.g., a flick of the response icon) is not detected within the given time from the incoming call.

Moreover, the control program 9A provides a function for performing off-hook when the operation accepted from the user at the time of incoming call is an operation corresponding to the response state level by referring to the response-state-level management data 9X and the response-state-level corresponding operation data 9Y which are explained later.

The response-state-level management data 9X is data that records the response state level of the smartphone 1. The response state level is information updated according to a failure situation of the normal response operation to the incoming call. FIG. 6 is a diagram of an example of response-state-level management data according to an embodiment. As illustrated in FIG. 6, a current response state level (e.g., level 0) in the smartphone 1 is recorded in the response-state-level management data 9X. In the present embodiment, the response-state level includes, for example, three levels of level 0, level 1, and level 2. The level 0 is a level at which off-hook is performed through the normal response operation to the incoming call (e.g., a flick of the response icon). The response state levels stored in the response-state-level management data 9X are updated, like level 0→level 1→level 2, according to a situation that can be determined as a failure in the normal response operation. The situation that can be determined as a failure in the normal response operation corresponds to, for example, a case where the call-receiving operation is detected before the normal response operation is performed.

The response-state-level corresponding operation data 9Y is data that records a condition for performing off-hook for the incoming call at each response state level in the smartphone 1. FIG. 7 is a diagram of an example of response-state-level corresponding operation data according to an embodiment. As illustrated in FIG. 7, the content of the condition for performing off-hook is recorded in association with a response state level (level 0 to level 2) in the response-state-level corresponding operation data 9Y. For example, as illustrated in FIG. 7, when the response state level is "level 0", "Flick of response icon" is associated with the level as an off-hook condition. As illustrated in FIG. 7, when the response state level is "level 1", "Detection of predetermined keyword twice within given time" is associated with the level as the off-hook condition. As illustrated in FIG. 7, when the response state level is "level 2", "Detection of predetermined keyword once within given time" is associated with the level as the off-hook condition. When the response state level is changed from the level 1 to the level 2, the content of the sound input being the condition for performing off-hook is changed to a mild condition. In this way, it is adjusted so that the response operation is made simpler and easier with an increase in the response state level. The content of the response operation illustrated in FIG. 7 is only an example, and is not therefore limited to the example illustrated in FIG. 7. It should be any content if a simpler and easier operation is associated therewith with an increase in the response state level.

The controller 10 executes the control program 9A to acquire the detection result of the attitude by the attitude detecting module 15 at the time of incoming call when the normal response operation (e.g., a flick of the response icon) is not detected within the given time from the incoming call. When the call-receiving operation is detected, the controller 10 increases the response state level by one level.

Furthermore, the controller 10 refers to the response-state-level management data 9X and the response-state-level corresponding operation data 9Y and executes the processing of off-hook at the time of incoming call when the content of the sound input satisfies the condition for performing off-hook.

Figure 8:
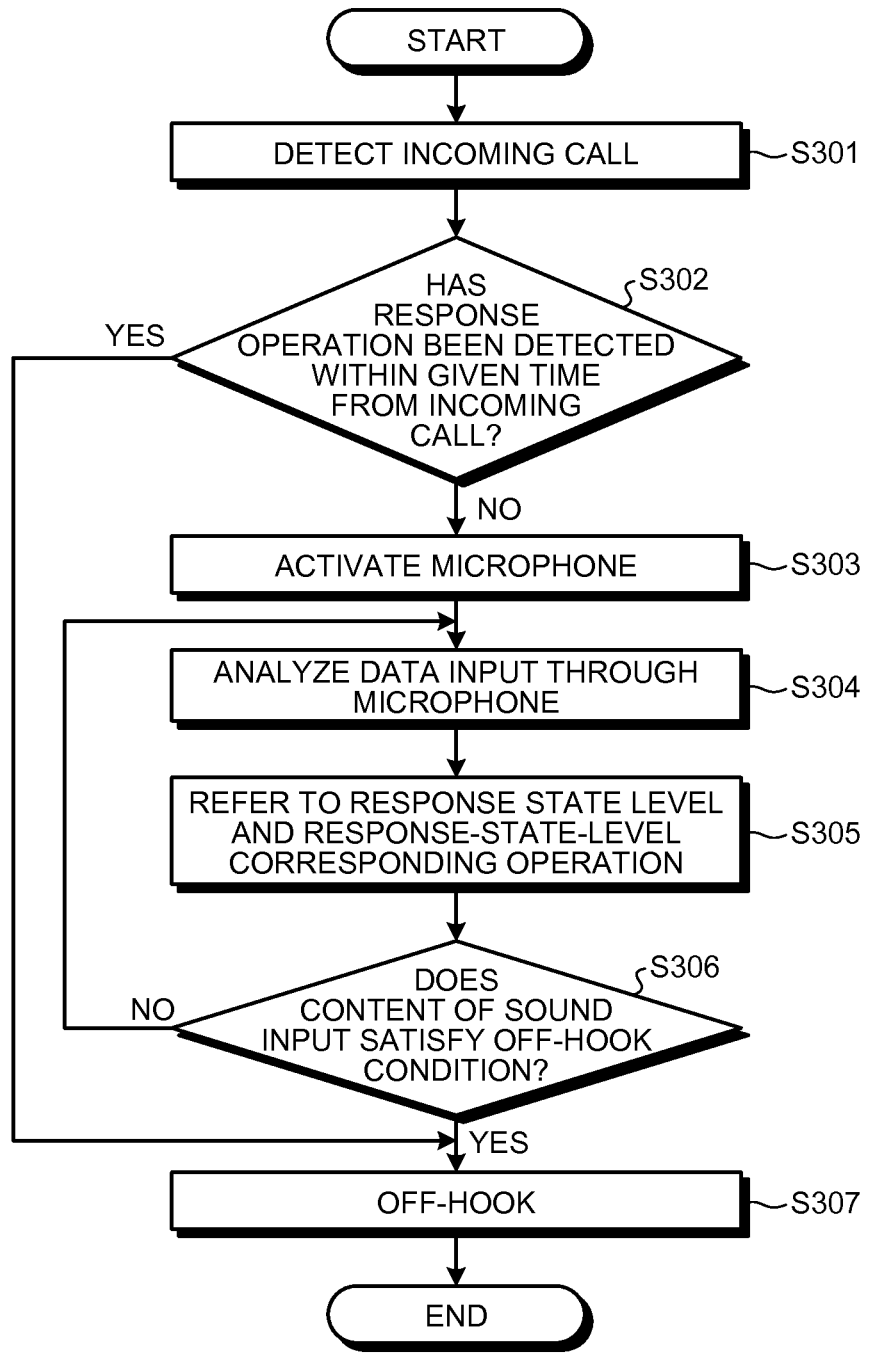
FIG. 8 is a flowchart illustrating a flow of control performed by smartphone according to an embodiment of some embodiments.
Figures 9, 10:
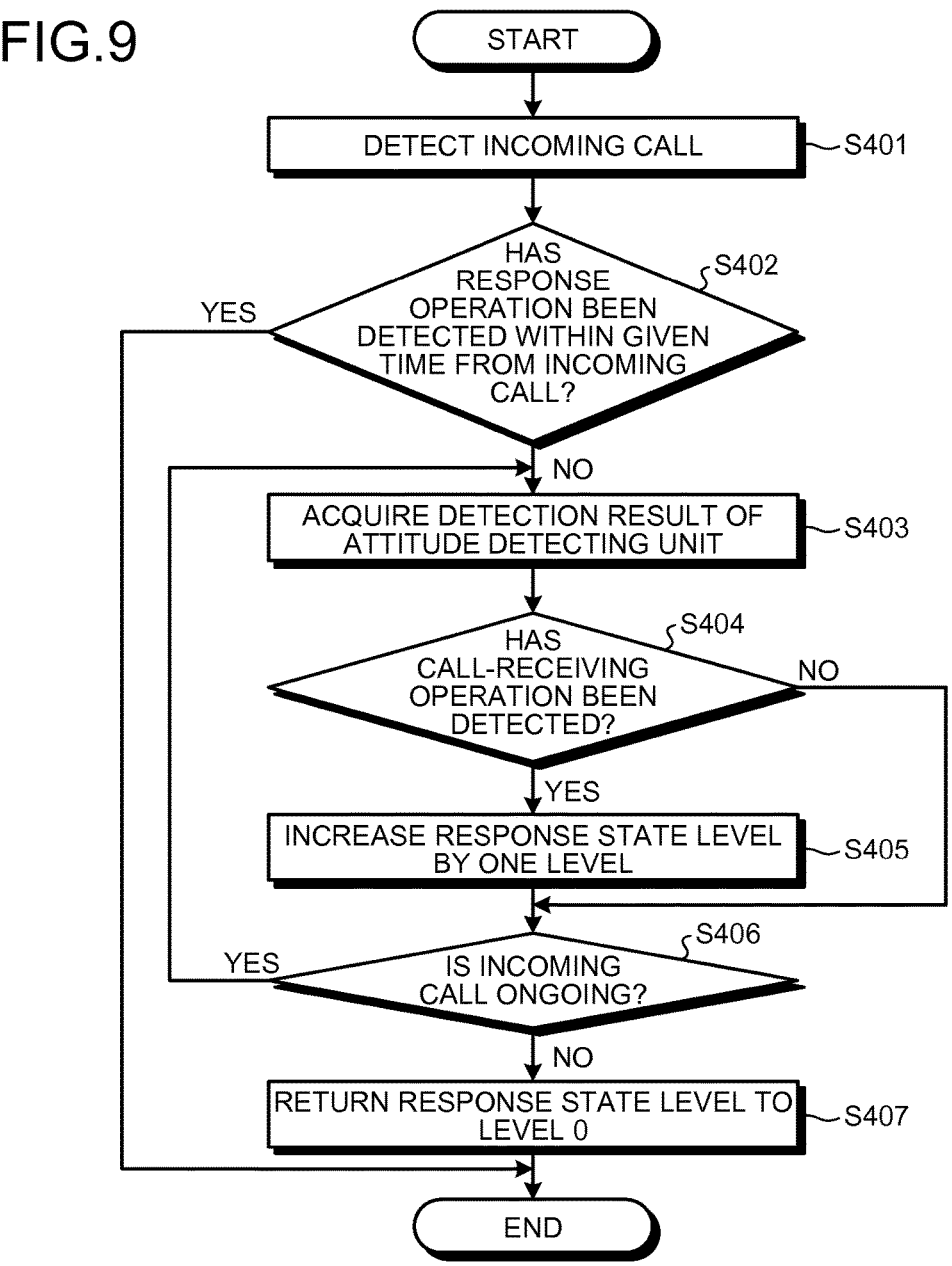
FIG. 9 is a flowchart illustrating a flow of control performed by a smartphone according to an embodiment of some embodiments.
FIG. 10 is a diagram of an example of response-state-level corresponding operation data according to an embodiment of some embodiments.

Subsequently, an example of the control performed by the smartphone 1 according to an embodiment will be explained below with reference to FIG. 8 and FIG. 9. FIG. 8 and FIG. 9 are flowcharts illustrating respective flows of controls performed by the smartphone 1 according to an embodiment. The controls in FIG. 8 and FIG. 9 are implemented by the controller 10 reading the control program 9A or the like from the storage 9 and executing the read program.

An example of control for performing off-hook when the content of the sound input satisfies the condition for performing off-hook will be explained below with reference to FIG. 8.

As illustrated in FIG. 8, when detecting an incoming call (Step S301), the controller 10 determines whether the response operation has been detected within the given time from the incoming call (Step S302).

When it is determined that the response operation has not been detected within the given time from the incoming call (No at Step S302), the controller 10 activates the microphone 8 (Step S303). Subsequently, the controller 10 analyzes the data input through the microphone 8 (Step S304), and refers to the response-state-level management data 9X and the response-state-level corresponding operation data 9Y stored in the storage 9 (Step S305).

Subsequently, the controller 10 determines whether the content of the sound input obtained by the analysis at Step S304 satisfies the off-hook condition (Step S306).

When it is determined that the content of the sound input satisfies the off-hook condition (Yes at Step S306), the controller 10 performs off-hook (Step S307), and ends the control illustrated in FIG. 8. On the other hand, when it is determined that the content of the sound input does not satisfy the off-hook condition (No at Step S306), the controller 10 returns to the procedure at Step S304.

At Step S302, when it is determined that the response operation has been detected within the given time from the incoming call (Yes at Step S302), the controller 10 proceeds to the procedure at Step S307, performs off-hook, and ends the control illustrated in FIG. 8.

An example of update control of the response state level will be explained below with reference to FIG. 9. As illustrated in FIG. 9, the control illustrated in FIG. 9 is executed in parallel to the control illustrated in FIG. 8. As illustrated in FIG. 9, when detecting an incoming call (Step S401), the controller 10 determines whether a response operation has been detected within the given time from the incoming call (Step S402).

When it is determined that the response operation has not been detected (No at Step S402), the controller 10 acquires the detection result of the attitude detecting module 15 (Step S403), and determines whether the call-receiving operation has been detected (Step S404).

When it is determined that the call-receiving operation has been detected (Yes at Step S404), the controller 10 increases the response state level by one level (Step S405). Then, the controller 10 determines whether the incoming call is ongoing (Step S406).

When it is determined that the incoming call is ongoing (Yes at Step S406), the controller 10 returns to the procedure at Step S403. On the other hand, when it is determined that the incoming call is not ongoing (No at Step S406), the controller 10 returns the response state level to the level 0 (Step S407), and ends the control illustrated in FIG. 9.

At Step S402, when it is determined that the response operation has been detected within the given time from the incoming call (Yes at Step S402), the controller 10 ends the control illustrated in FIG. 9.

At Step S404, when it is determined that the call-receiving operation has not been detected (No at Step S404), the controller 10 proceeds to the procedure at Step S406.

In the control illustrated in FIG. 9, when the call-receiving operation is detected without performing the response operation to the incoming call, the controller 10 determines that the normal response operation such as a flick of the response icon is failed, and updates the response state level so that the content of the sound input being the condition for off-hook becomes milder (so that the off-hook is more likely to be performed).

In the control illustrated in FIG. 9, the control for updating the response state level based on whether the call-receiving operation is detected so that the content of the sound input being the condition for off-hook becomes milder (so that the off-hook is more likely to be performed) has been explained; however, the control is not limited thereto. For example, it may be configured to record an operation other than the response operation for the touch screen 2B after the incoming call (a touch on the response icon, an insufficient swipe, or so, which is not determined as an operation for off-hook) and to update the response state level based on the frequency of any operation other than the recorded response operation.

An embodiment of some embodiments as follows will explain examples of control for performing off-hook when a user's operation satisfies the condition for performing off-hook and of control for updating the condition for performing off-hook according to user's sound input or operation input.

The functional configuration of the smartphone 1 according to an embodiment is different from above embodiments in some points explained below.

The control program 9A provides a function for updating the response state level recoded in the response-state-level management data 9X, which is explained later, according to the situation that can be determined as a failure in the previously assumed normal response operation to the incoming call. Specifically, the control program 9A provides a function for increasing the response state level by one level when the microphone 8 is activated at the time of incoming call, the data input through the microphone 8 within the given time is analyzed, and when a predetermined keyword is detected from the data input through the microphone 8 within the given time. On the other hand, the control program 9A provides a function for decreasing the response state level by one level when the microphone 8 is activated at the time of incoming call, the data input through the microphone 8 within the given time is analyzed, and when a predetermined keyword is not detected from the data input through the microphone 8 within the given time.

Furthermore, the control program 9A provides a function for referring to the response-state-level management data 9X and the response-state-level corresponding operation data 9Y, which are explained later, and performing off-hook when the operation accepted from the user at the time of incoming call is an operation corresponding to the response state level.

The response-state-level management data 9X is, similarly to above embodiments, data (see, for example, FIG. 6) that records the response state level in the smartphone 1, and is updated according to a failure situation of the normal response operation to the incoming call. In an embodiment, the response-state level includes, for example, the three levels of level 0, level 1, and level 2. The level 0 is a level capable of performing off-hook through the normal response operation to the incoming call (e.g., a flick of the response icon). The response state levels stored in the response-state-level management data 9X are updated, such as level 0→level 1→level 2 according to a situation that can be determined as a failure in the normal response operation. The situation that can be determined as a failure in the normal response operation includes, for example, a case where the predetermined keyword or the predetermined operation is detected before the normal response operation is performed. The response state level may be decreased one by one according to the situation of user's response operation.

The response-state-level corresponding operation data 9Y is, similarly to above embodiments, data that records a condition for performing off-hook for the incoming call at each response state level in the smartphone 1. FIG. 10 is a diagram of an example of response-state-level corresponding operation data according to an embodiment. As illustrated in FIG. 10, the content of the off-hook condition for performing off-hook is recorded in association with a response state level (level 0 to level 2) in the response-state-level corresponding operation data 9Y. For example, as illustrated in FIG. 10, when the response state level is "level 0", "Flick of response icon" is associated with the level as the off-hook condition. As illustrated in FIG. 10, when the response state level is "level 1", "Tap on response icon" is associated with the level as the off-hook condition. As illustrated in FIG. 10, when the response state level is "level 2", "Touch on display" is associated with the level as the off-hook condition. In this way, a simpler and easier operation than the normal response operation i.e. a flick of the response icon is associated with the level with an increase in the response state level. The content of the response operation illustrated in FIG. 10 is only an example, and therefore the content should be such that the higher the response state level is, the simpler and easier operation is associated with the level.

The controller 10 executes the control program 9A to activate the microphone 8 at the time of incoming call, analyzes data input through the microphone 8 within the given time, and performs the processing of increasing the response state level by one level when the predetermined keyword is detected from the data input to the microphone 8 within the given time. Meanwhile, the controller 10 executes the control program 9A to activate the microphone 8 at the time of incoming call, analyzes data input through the microphone 8 within the given time, and performs the processing of decreasing the response state level by one level when the predetermined keyword is not detected from the data input to the microphone 8 within the given time.

Moreover, the controller 10 refers to the response-state-level management data 9X and the response-state-level corresponding operation data 9Y, and executes the processing of off-hook when the operation accepted from the user at the time of incoming call is an operation corresponding to the response state level.

Subsequently, an example of control performed by the smartphone 1 according to an embodiment will be explained below with reference to FIGS. 11 to 14. FIGS. 11 to 14 are flowcharts illustrating respective flows of controls performed by the smartphone 1 according to the third embodiment. The controls illustrated in FIG. 11 to FIG. 14 are implemented by the controller 10 reading the control program 9A or the like from the storage 9 and executing the read program.

The control of off-hook based on the response-state-level management data 9X and the response-state-level corresponding operation data 9Y will be explained below with reference to FIG. 11.

Figure 11:
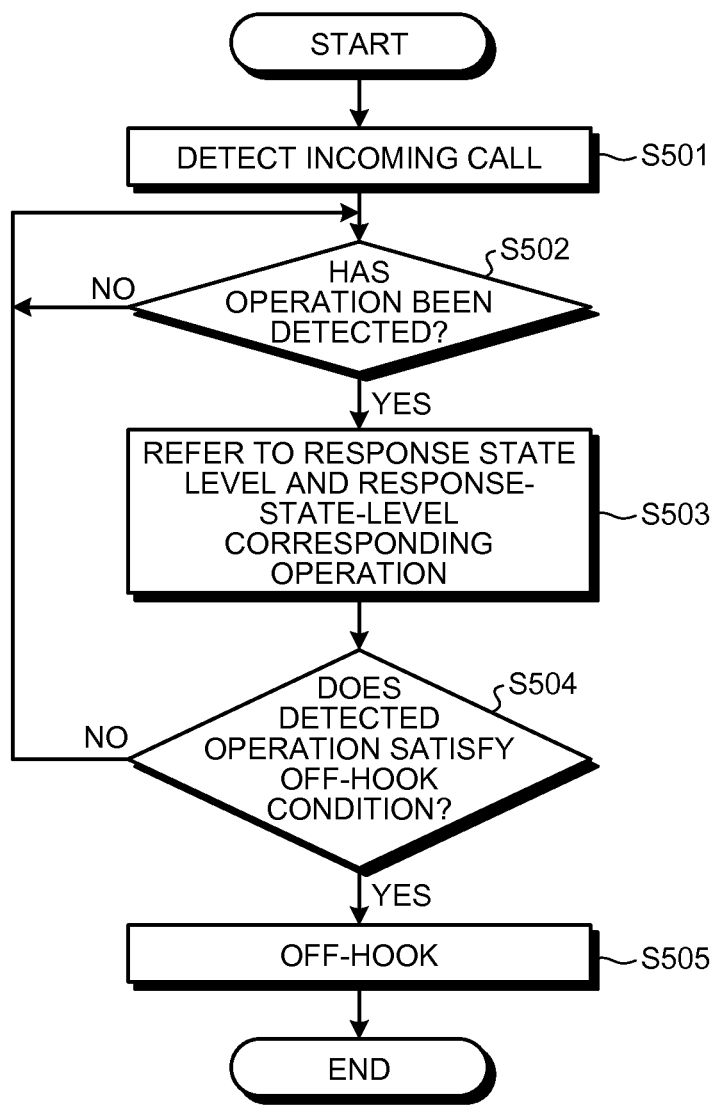
FIG. 11 is a flowchart illustrating a flow of control performed by a smartphone according to an embodiment of some embodiments.

As illustrated in FIG. 11, when detecting an incoming call (Step S501), the controller 10 determines whether an operation has been detected through the touch screen 2B (Step S502). When it is determined that an operation has not been detected (No at Step S502), the controller 10 continues the detection of the operation.

Meanwhile, when it is determined that an operation has been detected (Yes at Step S502), the controller 10 refers to the response-state-level management data 9X and the response-state-level corresponding operation data 9Y stored in the storage 9 (Step S503). Subsequently, the controller 10 determines whether the operation detected at Step S502 satisfies the off-hook condition (whether the operation matches the operation corresponding to the current response state level) (Step S504).

When it is determined that the operation detected at Step S502 satisfies the off-hook condition (Yes at Step S504), the controller 10 performs off-hook (Step S505), and ends the control illustrated in FIG. 11.

On the other hand, when it is determined that the operation detected at Step S502 does not satisfy the off-hook condition (No at Step S504), the controller 10 returns to Step S502, and determines whether the next operation has been detected.

Figure 12:
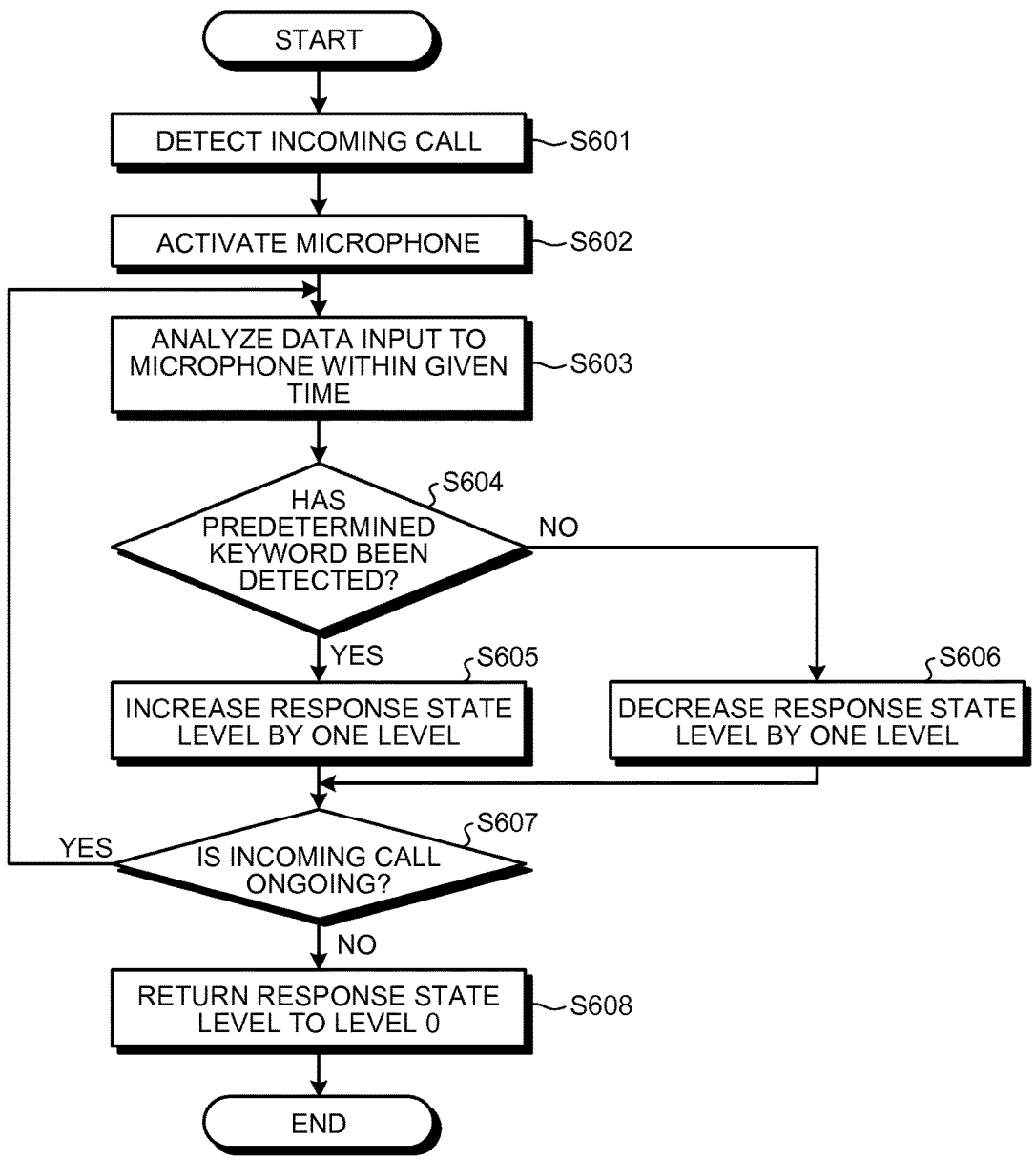
FIG. 12 is a flowchart illustrating a flow of control performed by a smartphone according to an embodiment of some embodiments.

Update control of the response state level by the sound input will be explained below with reference to FIG. 12. The control illustrated in FIG. 12 is executed in parallel to the control illustrated in FIG. 11. As illustrated in FIG. 12, when detecting an incoming call (Step S601), the controller 10 activates the microphone 8 (Step S602) and analyzes the data input to the microphone 8 within the given time (Step S603). The given time is previously set. When it is right after the activation of the microphone 8, the given time at Step S603 corresponds to a given time from the activation of the microphone 8. When it is not right after the activation of the microphone 8, the given time at Step S603 corresponds to a given time right after the completion of the previous analysis.

Subsequently, the controller 10 determines whether a predetermined keyword has been detected from the data input to the microphone 8 (Step S604). The predetermined keyword corresponds to a keyword assumed as a response to the phone call such as "Hello" or "Yes".

When it is determined that a predetermined keyword has been detected (Yes at Step S604), the controller 10 increases the response state level by one level (Step S605).

Meanwhile, when it is determined that a predetermined keyword has not been detected (No at Step S604), the controller 10 decreases the response state level by one level (Step S606). The controller 10 updates the data for the response-state-level management data 9X stored in the storage 9 in association with the processing at Step S605 and Step S606.

Subsequently, the controller 10 determines whether the incoming call is ongoing (Step S607). For example, the controller 10 determines whether the off-hook is performed in the control illustrated in FIG. 12 or whether the incoming call is interrupted.

When it is determined that the incoming call is ongoing (Yes at Step S607), the controller 10 returns to Step S603, and continues the control for updating the response state level. On the other hand, when it is determined that the incoming call is not ongoing (No at Step S607), the controller 10 returns the response state level to the level 0 (Step S608), and ends the control illustrated in FIG. 12.

The control illustrated in FIG. 12 will be explained with reference to some cases. When a keyword such as "hello" is detected within 5 seconds right after the activation of the microphone 8, the controller 10 increases the response state level by one level. When a keyword such as "hello" or "yes" is detected while the incoming call is ongoing and the keyword such as "hello" or "yes" is again detected within 5 seconds from then, the controller 10 further increases the response state level by one level. When the response state level is the level 2, the controller 10 holds it as the level 2. Meanwhile, when the incoming call is ongoing, the controller 10 increases the response state level by one level according to the detection of the keyword such as "hello" or "yes", and decreases the response state level by one level when the keyword such as "hello" or "yes" is not detected within 5 seconds from then. When the response state level is the level 0, the controller 10 holds it as the level 0. In this way, at the time of incoming call, the controller 10 adjusts the response state level according to the detection of the predetermined keyword within the given time.

In the control illustrated in FIG. 12, the example has been explained in which the smartphone 1 increases the response state level by one level at the time of incoming call when a predetermined keyword is detected within a given time; however, the detected time of the predetermined keyword and the number of detection times of the keyword may be precisely controlled. For example, when the predetermined keyword is detected three times within 10 seconds, the smartphone 1 may determine whether the predetermined keyword is detected twice within 10 seconds at the next detection timing. Alternatively, for example, when the predetermined keyword is detected once within 10 seconds, then the smartphone 1 may determine whether the predetermined keyword is detected once within 20 seconds. In this way, when the situation thought that the user might fail in the normal response operation (e.g., a flick of the response icon) is continued, the smartphone 1 updates the response state level so that the response-state-level corresponding operation becomes simpler and easier.

Figure 13:
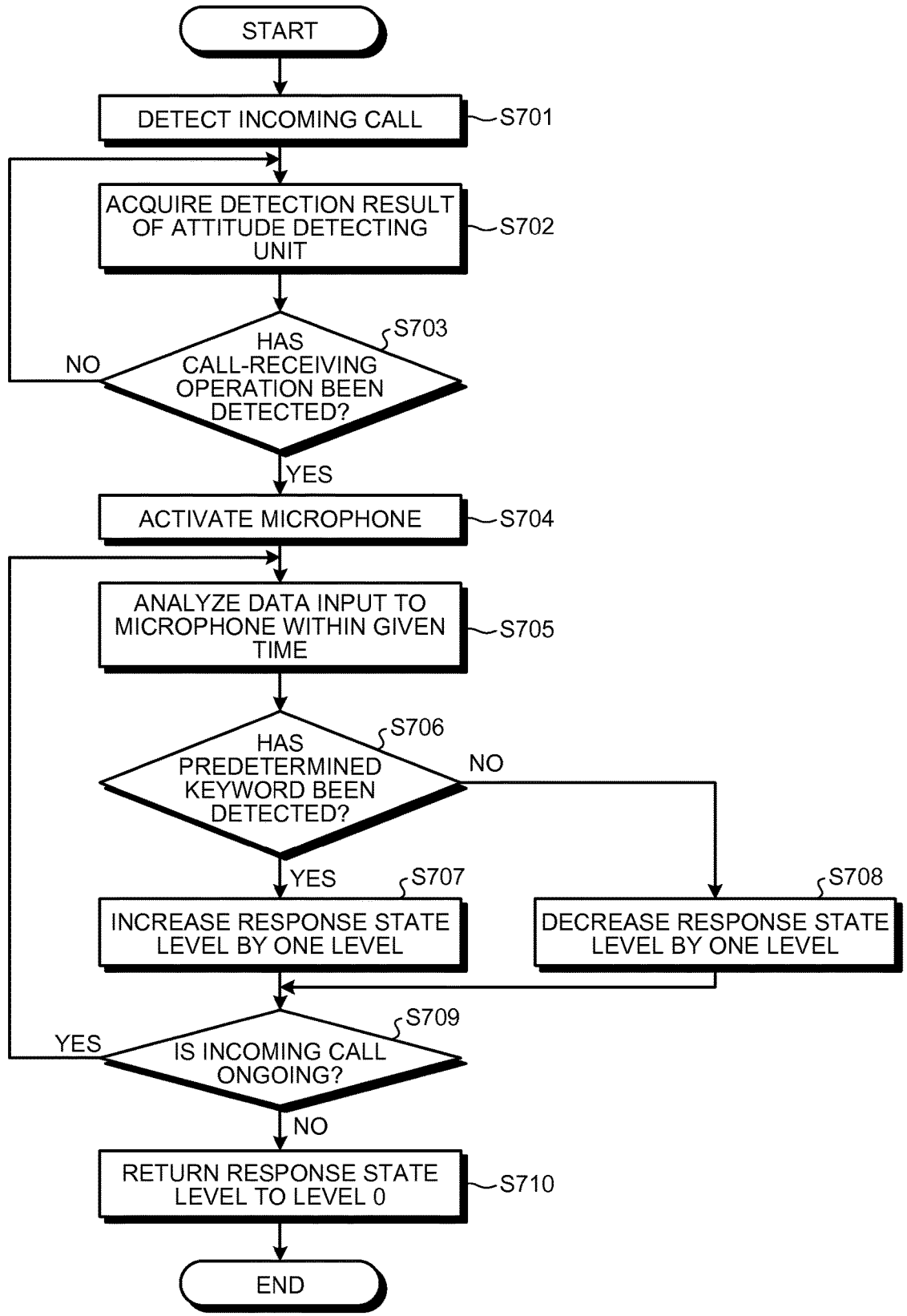
FIG. 13 is a flowchart illustrating a flow of control performed by a smartphone according to an embodiment of some embodiments.

The control for activating the microphone 8 when the call-receiving operation is detected will be explained with reference to FIG. 13. As illustrated in FIG. 13, when detecting an incoming call (Step S701), the controller 10 acquires the detection result of the attitude detecting module 15 (Step S702), and determines whether the call-receiving operation has been detected (Step S703).

When it is determined that the call-receiving operation has been detected (Yes at Step S703), the controller 10 activates the microphone 8 (Step S704), and analyses data input to the microphone 8 within the given time (Step S705).

Subsequently, the controller 10 determines whether the predetermined keyword has been detected from the data input to the microphone 8 (Step S706).

When it is determined that the predetermined keyword has been detected (Yes at Step S706), the controller 10 increases the response state level by one level (Step S707). On the other hand, when it is determined that the predetermined keyword has not been detected (No at Step S706), the controller 10 decreases the response state level by one level (Step S708).

Subsequently, the controller 10 determines whether the incoming call is ongoing (Step S709). When it is determined that the incoming call is ongoing (Yes at Step S709), the controller 10 returns to Step S705, and continues the control for updating the response state level. On the other hand, when it is determined that the incoming call is not ongoing (No at Step S709), the controller 10 returns the response state level to the level 0 (Step S710), and ends the control illustrated in FIG. 13.

At Step S703, when it is determined that the call-receiving operation has not been detected (No at Step S703), the controller 10 returns to Step S702, and again acquires the detection result of the attitude detecting module 15.

Control for updating the response state level through an operation input will be explained with reference to FIG. 14.

Figures 14, 15:
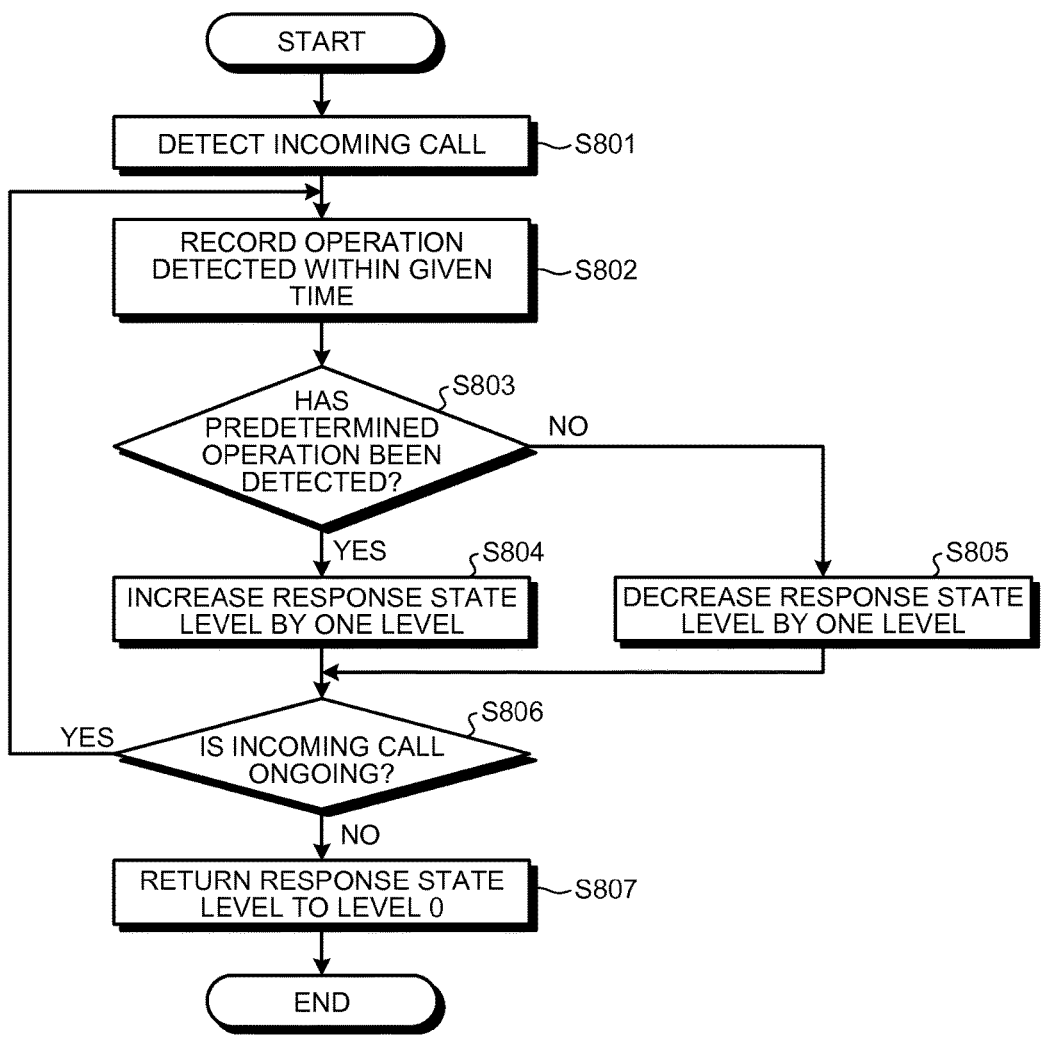
FIG. 14 is a flowchart illustrating a flow of control performed by a smartphone according to an embodiment of some embodiments.
FIG. 15 is a diagram of another example of the response-state-level corresponding operation data.

As illustrated in FIG. 14, when detecting an incoming call (Step S801), the controller 10 records an operation detected within a given time through the touch screen 2B (Step S802). The given time is previously set. When it is right after the arrival of the incoming call, the given time at Step S802 corresponds to a given time right after the arrival of the incoming call. When it is not right after the arrival of the incoming call, the given time at Step S802 corresponds to a given time right after the completion of the previous detection. It is a purpose of the controller 10 is to record failures of user's normal response operation through the procedure at Step S802. The controller 10 records, for example, a touch on the response icon or an insufficient swipe, which is not determined as an operation for off-hook.

Subsequently, the controller 10 determines whether a predetermined operation has been detected in operations recorded at Step S802 (Step S803). The controller 10 determines whether the predetermined operation such as a touch on the response icon or an insufficient swipe, which is not determined as an operation for off-hook, has been detected.

When it is determined that the predetermined operation has been detected (Yes at Step S803), the controller 10 increases the response state level by one level (Step S804). On the other hand, when it is determined that the predetermined operation has not been detected (No at Step S803), the controller 10 decreases the response state level by one level (Step S805).

Subsequently, the controller 10 determines whether the incoming call is ongoing (Step S806). When it is determined that the incoming call is ongoing (Yes at Step S806), the controller 10 returns to Step S802, and continues the control for updating the response state level. On the other hand, when it is determined that the incoming call is not ongoing (No at Step S806), the controller 10 returns the response state level to the level 0 (Step S807), and ends the control illustrated in FIG. 14.

In the control illustrated in FIG. 14, the example has been explained in which the smartphone 1 increases the response state level by one level at the time of incoming call when the predetermined operation is detected within the given time; however, the detected time of the predetermined operation and the number of detection times of the predetermined operation may be controlled. For example, when a predetermined operation is detected three times within 10 seconds, the smartphone 1 may determine whether the predetermined operation is detected twice within 10 seconds at the next detection timing. Alternatively, for example, when a predetermined operation is detected once within 10 seconds, then the smartphone 1 may determine whether the predetermined operation is detected once within 20 seconds. In this way, the smartphone 1 updates the response state level so that the more the user fails in the normal response operation (e.g., a flick of the response icon), the simpler and easier the response-state-level corresponding operation becomes.

As explained above embodiments, the response state level is updated so that when the predetermined keyword or the predetermined operation is detected within the given time, the response state level corresponding operation becomes simpler and easier. Therefore, according to an embodiment, the response to the incoming call becomes easier even if the off-hook is performed by an operation for the touch screen display 2 instead of the off-hook performed by the sound input as explained in above embodiments.

For example, in the response-state-level corresponding operation data 9Y illustrated in FIG. 10, the example has been explained in which an operation for the touch screen display 2 is associated with the response state level as a condition for performing off-hook; however, embodiments are not limited thereto. FIG. 15 is a diagram of another example of the response-state-level corresponding operation data. As illustrated in FIG. 15, for example, when the response state level is the level 0, a condition such as a flick of the response icon may be associated with the level as the off-hook condition. When the response state level is the level 1, a condition such as detection of a predetermined keyword twice within 10 seconds may be associated with the level as the off-hook condition, and when it is the level 2, a condition such as detection of call-receiving operation may be associated with the level as the off-hook condition. In this way, different conditions such as the content of a touch operation, the content of sound input, and detection of a call-receiving operation may be associated with the response state levels respectively so that the higher the response state level increases, the easier the off-hook performance becomes.

In above embodiments, the smartphone has been explained as an example of the device according to the appended claims; however, the device according to the appended claims is not limited to the smartphone. The device according to the appended claims may be any device other than the smartphone if the device is an electronic device with a phone call function and a touch screen function.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The invention claimed is:

1. A mobile electronic device, comprising:
a sound input module;
a touch screen display;
a storage configured to store a condition for performing an off-hook operation;
an attitude detecting module configured to detect an attitude of the mobile electronic device; and
a controller configured to,
upon detecting an incoming call,
perform the off-hook operation in response to a response operation for receiving the call being detected through the touch screen display,
initiate acceptance of a sound input via the sound input module in response to no response operation for receiving the call being detected through the touch screen display, and subsequently perform the off-hook operation in response to content of the accepted sound input meeting the condition, and
change the condition in response to a movement of a user of the mobile electronic device being detected on a basis of detection results of the attitude detecting unit.

2. A mobile electronic device, comprising:
a sound input module;
a touch screen display;
a storage configured to store a condition for performing an off-hook operation;
an attitude detecting module configured to detect an attitude of the mobile electronic device; and
a controller configured to,
upon detecting an incoming call,
perform the off-hook operation in response to an operation detected through the touch screen display being determined as a response operation for receiving the call,
initiate acceptance of a sound input via the sound input module in response to an operation detected through the touch screen display being determined as an operation different from the response operation for receiving the call, and subsequently perform the off-hook operation in response to content of the accepted sound input meeting the condition, and
change the condition in response to a movement of a user of the mobile electronic device being detected on a basis of detection results of the attitude detecting unit.

3. A control method executed by a mobile electronic device, including a sound input module, a touch screen display, a storage configured to store a condition for performing an off-hook operation, and an attitude detecting module configured to detect an attitude of the mobile electronic device, the control method comprising:
upon detecting an incoming call,
performing the off-hook operation in response to a response operation for receiving the call being detected through the touch screen display,
initiating acceptance of a sound input via the sound input module in response to no response operation for receiving the call being detected through the touch screen display, and subsequently performing the off-hook operation in response to content of the accepted sound input meeting the condition, and
changing the condition in response to a movement of a user of the mobile electronic device being detected on a basis of detection results of the attitude detecting unit.

4. A non-transitory computer readable storage medium storing computer instructions for causing, when executed by a mobile electronic device including a sound input module a touch screen display, a storage configured to store a condition for performing an off-hook operation, and an attitude detecting module configured to detect an attitude of the mobile electronic device, the mobile electronic device to perform operations comprising:
upon detecting an incoming call,
performing the off-hook operation in response to a response operation for receiving the call being detected through the touch screen display,
initiating acceptance of a sound input via the sound input module in response to no response operation for receiving the call being detected through the touch screen display, and subsequently performing the off-hook operation in response to content of the accepted sound input meeting the condition, and
changing the condition in response to a movement of a user of the mobile electronic device being detected on a basis of detection results of the attitude detecting unit.

* * * * *